(12) United States Patent
Baker

(10) Patent No.: US 6,386,929 B1
(45) Date of Patent: May 14, 2002

(54) AMPHIBIOUS VEHICLES

(75) Inventor: David Paul Baker, London (GB)

(73) Assignee: Barravore Limited (GB)

(*) Notice: Subject to any disclaimer, the term of this patent is extended or adjusted under 35 U.S.C. 154(b) by 0 days.

(21) Appl. No.: 09/554,284

(22) PCT Filed: Nov. 10, 1998

(86) PCT No.: PCT/GB98/03351

§ 371 Date: Jul. 20, 2000

§ 102(e) Date: Jul. 20, 2000

(87) PCT Pub. No.: WO99/24273

PCT Pub. Date: May 20, 1999

(30) Foreign Application Priority Data

Nov. 10, 1997 (GB) .............................................. 9723631

(51) Int. Cl.⁷ .................................................. B60F 3/00
(52) U.S. Cl. .................................................... 440/12.5
(58) Field of Search ............................ 440/12.5, 12.51

(56) References Cited

U.S. PATENT DOCUMENTS 3,895,596 A  7/1975  Amour
4,838,194 A  6/1989  Williamson

FOREIGN PATENT DOCUMENTS

DE          3522041 A1    1/1987
FR          2690385       10/1993

Primary Examiner—Jesus D. Sotelo
(74) Attorney, Agent, or Firm—Townsend and Townsend and Crew LLP

(57) ABSTRACT

An amphibious vehicle has a drive system comprising a driven wheel (16) of the vehicle with which is associated a guide (38) having inlet (44) and outlet (46) means and the wheel being formed such that when the wheel is in water its rotation draws water into the guide via said inlet, compresses that water and feeds it to the outlet. The driven wheel of the vehicle has the form of an impeller operable to draw water into the guide and feed it to the outlet means. The guide is formed in two parts on opposed sides of the wheel, the first part having one or more apertures opening forwardly of the direction of movement of the vehicle and forming inlet means whilst the second part has a jet rearwardly and upwardly of the direction of forward movement of the vehicle. Each part is formed with means providing a seal between it and the rim of the driven wheel. The parts are carried with the driven wheel. The vehicle described is motor tricycle having a pair of front wheels and a single rear driven wheel. The front wheels (14) of the vehicle have mud guards (26) which when in water may be rotated to underlie the vehicle wheels and form skies to ease the forward movement of the vehicle through the water. Running boards (58) extend rearwardly of the mud guards to help in planing. The second part of the guide arrangement has an outlet coupled to a number, six, steering jets mounted on the body of the vehicle.

15 Claims, 5 Drawing Sheets

AMPHIBIOUS VEHICLES

TECHNICAL FIELD

The invention relates to amphibious vehicles.

BACKGROUND ART

Amphibious vehicles have been known for some time and generally comprise a vehicle having two drive systems. The first drive system is for powering the vehicle when on land and may comprise a motor driving wheels or tracks of the vehicle. The second drive system (which may or may not be powered from the same power source as the first drive system) normally comprises a propeller at the rear of the vehicle or, more recently, means for drawing water through a channel in the vehicle and ejecting it to the rear.

Necessarily the propellers provided in the known amphibious vehicles must be small so that they do not interfere with operation of the vehicle when on land and if water is drawn through a vehicle it adds to the mass of the vehicle causing it to ride lower in the water with an increase in drag. As a result the amphibious vehicles known to me, which may quite speedy on land are generally slow and cumbersome when in the water.

An object of the invention is to provide an amphibious vehicle having a drive system which will alleviate or overcome the above noted disadvantage of the known vehicles.

DISCLOSURE OF THE INVENTION

In a first aspect the invention provides an amphibious vehicle having a drive system comprising a driven wheel of the vehicle with which is associated a guide arrangement, the guide arrangement having inlet and outlet means and the wheel being formed such that when the wheel is in water its rotation draws water into the guide arrangement via and inlet means, compresses the water and feeds it to the outlet means.

The drive wheel of the vehicle preferably has the form of an impeller operable to draw water into the guide arrangement and feed it to the outlet means.

The guide arrangement may be formed in two parts, a first part having one or more apertures opening forwardly of the direction of forward movement of the vehicle and forming said inlet means whilst the second part has an aperture opening rearwardly of the direction of forward movement of the vehicle and forming said outlet means.

The two parts are preferably on opposed sides of the wheel.

Said two parts of the guide arrangement are preferably formed with means providing a seal between each part and the rim of the wheel with which the guide arrangement is associated.

Said parts of the guide arrangement may be fixed to the suspension supporting the associated wheel and be carried with that wheel.

Said inlet means of said first part of the guide arrangement may comprise a plurality of apertures each opening in the direction of forward movement of the vehicle.

The jet outlet may also extend upwardly of the vehicle.

The said outlet means may have means for controlling the volume of water issuing therefrom.

In one advantageous form the vehicle has a pair of wheels at the front of the vehicle and a single, driven wheel at the rear of the vehicle with which said guide arrangement is associated.

The front heels of the vehicle may have mud guards associated therewith which when the vehicle is on land lie generally above the wheels and which when the vehicle is in water may be rotated to underlie the vehicle wheels and form skies to ease the forward movement of the vehicle through the water.

The vehicle is further preferably provided with running boards extending rearwardly of the mud guards associated with the front wheels of the vehicle.

Advantageously the second part of said guide arrangement has an outlet coupled to a number of steering jets mounted on the body of the vehicle.

There may be six such steering jets on the body of the vehicle.

The above and other aspects, features and advantages of the invention will become clearer from the following description of an embodiment thereof now made with reference to the accompanying drawings.

MODES OF CARRYING OUT THE INVENTION

Figure 1:
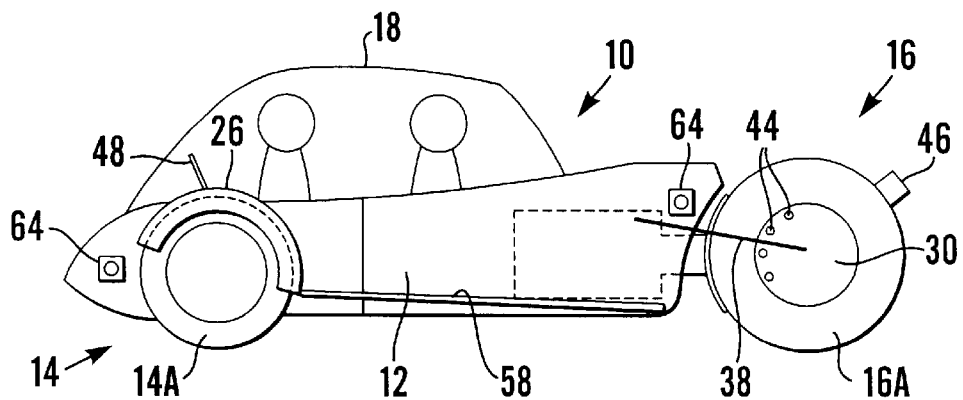
FIGS. 1, 2 and 3 are respectively schematic side, plan and front views of an amphibious vehicle embodying the invention.
Figure 2:
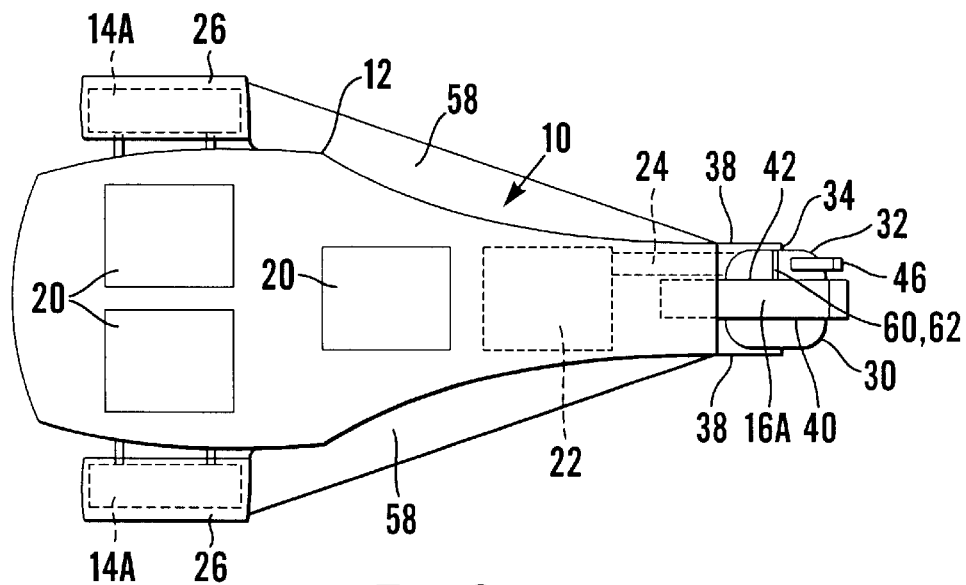
Figure 3:
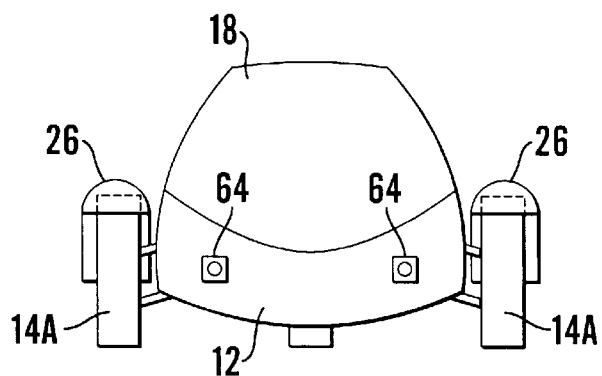
Figure 4:
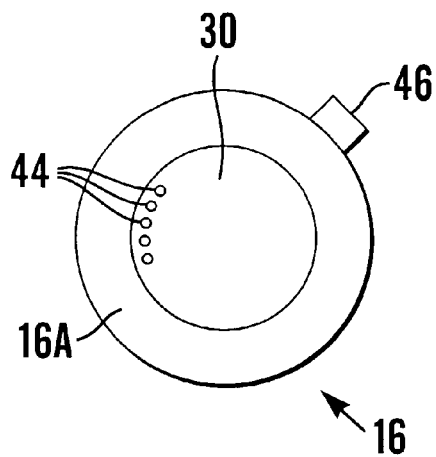
FIGS. 4 and 5 are respectively enlarged opposed side view of a driven wheel of the vehicle of FIG. 1.
Figure 5:
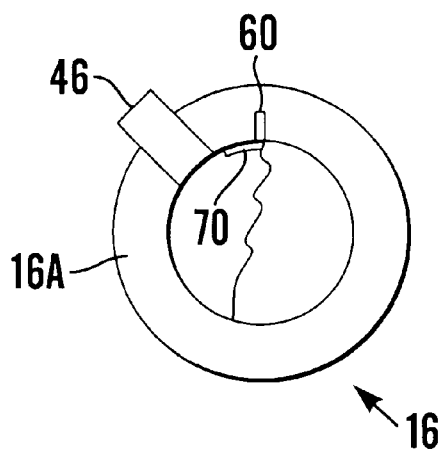

The drawings show an amphibious vehicle 10 to have a body 12. The vehicle has three wheels two of which 14 are at the front of the vehicle whilst the third, driven, wheel 16 is provided at the rear of the vehicle. The wheels are fitted pneumatic tyres 14A and 16A respectively.

The body is formed of double fibreglass skins with a closed cell foam core. The body may have a clear plastics material windscreen/roof 18 as shown.

Three seats are provided in the vehicle as shown at 20; two towards the front of the vehicle, between the front wheels, and one behind. The driver will normally sit in the vehicle one of the foremost seat 20.

An engine/gearbox 22 drives the rear wheel 16 via a shaft 24 passing through a flexible rubber seal formed in the body 12.

The front wheels 14 having overlying mud guards of the particular shape shown at 26 whilst the rear wheel is provided with a two-part guide arrangement. The first part 30 and the second part 32 of the guide arrangement are carried on a spindle 34 passing through the hub of the wheel. Spindle 34 is supported on a pair of arms 38 fixed to the body 12 and running rearwardly of it. Each of the casing parts has an associated seal 40, 42 acting between its innermost edge and the rim of the wheel. The first casing part 30 is provided with series of apertures facing generally forwardly of the direction of motion of the vehicle as indicated at 44.

The second casing part 32 is provided with an outlet 46 facing rearwardly and upwardly of the wheel 16.

When the vehicle is being driven on land the driver controls the power to the wheel 16 by a conventional throttle control and use of the gear box. Braking is effected by inboard brakes. Steering of the front wheels 14 is effected using a conventional rack and pinion steering system from a steering wheel 48 in the vehicle.

It will be appreciated that the vehicle may be driven as a motor drive tricycle on land with the parts 30, 32 of the guide means 28 clear of the ground.

When it is desired to go onto the water the driver simple drives the vehicle into the water unit it floats.

It will be seen that in this position the inlet of the guide means formed by the apertures 44 in the first casing part 30 is beneath the surface of the water through which water will enter the enclosure. This entry is to one side of the wheel 16, as shown in the drawings, to the left side of the wheel.

Figure 6A:
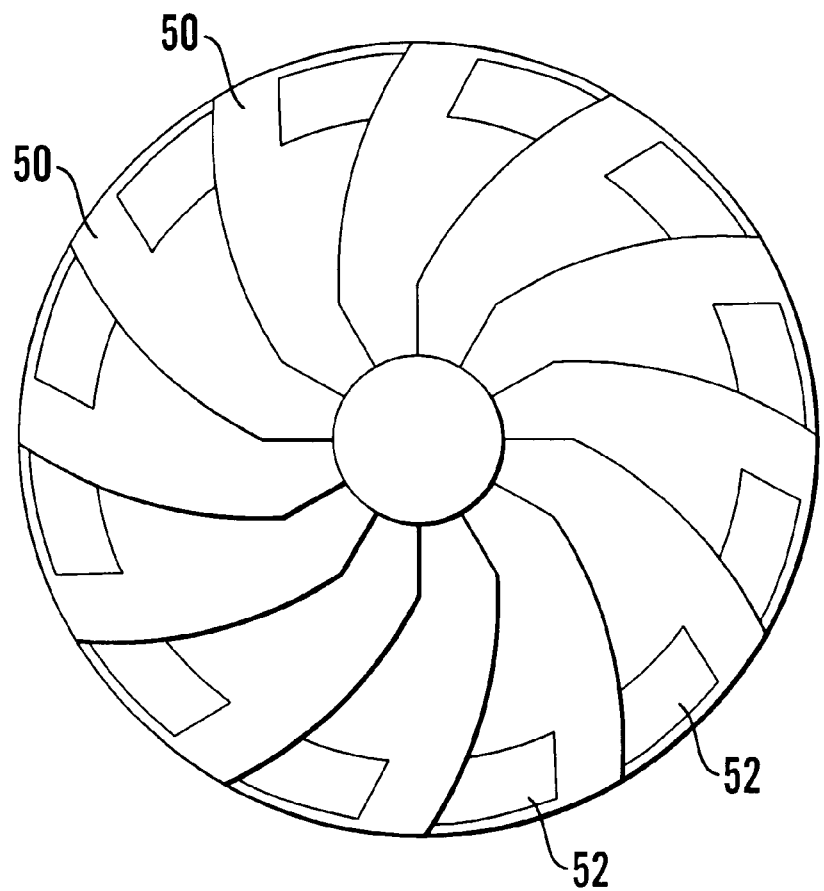
FIG. 6 shows at A and B respectively plan and side view of the central parts of the driven wheel of the vehicle.
Figure 6B:
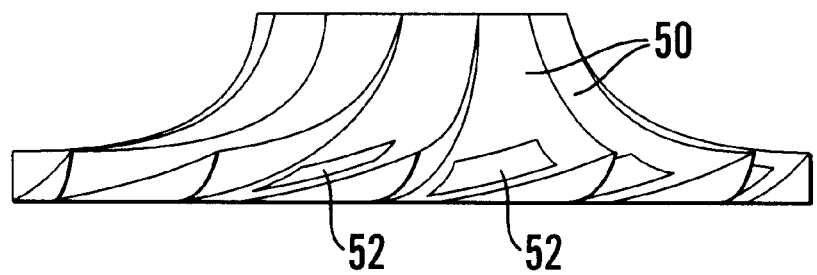

The central part of the wheel is shown in detail in the FIGS. 6A and 6B and it can be seen that it has the form of an enshrouded back swept impeller with inducer comprising a series of veins 50 which as the wheel rotates act to draw water in via the apertures 44 that water then being forced through slots 52 at the edges of the wheel into the second casing part 32. The impeller form of the wheel acts to compress any water drawn into it which is then fed to the second casing part 32 from which it is ejected via the outlet jet 46.

Figure 8A:
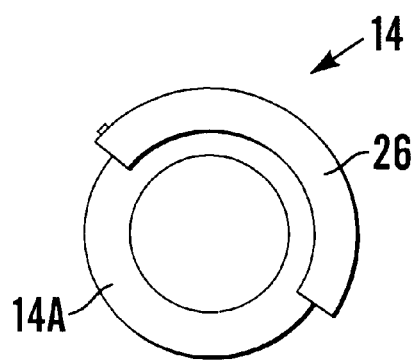
FIG. 8 shows at A and B parts of the vehicle in respective operative positions.
Figure 8B:
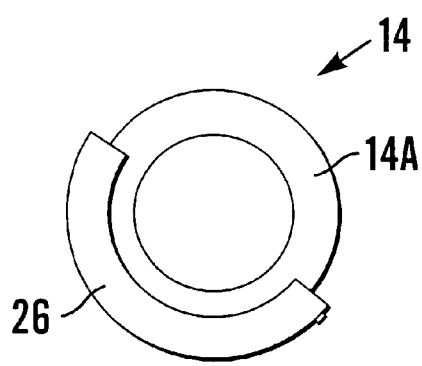

When a vehicle is in water the mud guards 26 may be rotated, as indicated in FIG. 8B to underlie the front wheels 14 of the vehicle and form skies to ease the movement of the vehicle through the water. To enhance this plan effect when the vehicle is being driven through the water the main body of the vehicle is provided with running boards 58 to either side which extend from the mud guards 26 to the rear of the body of the vehicle.

Figure 7:
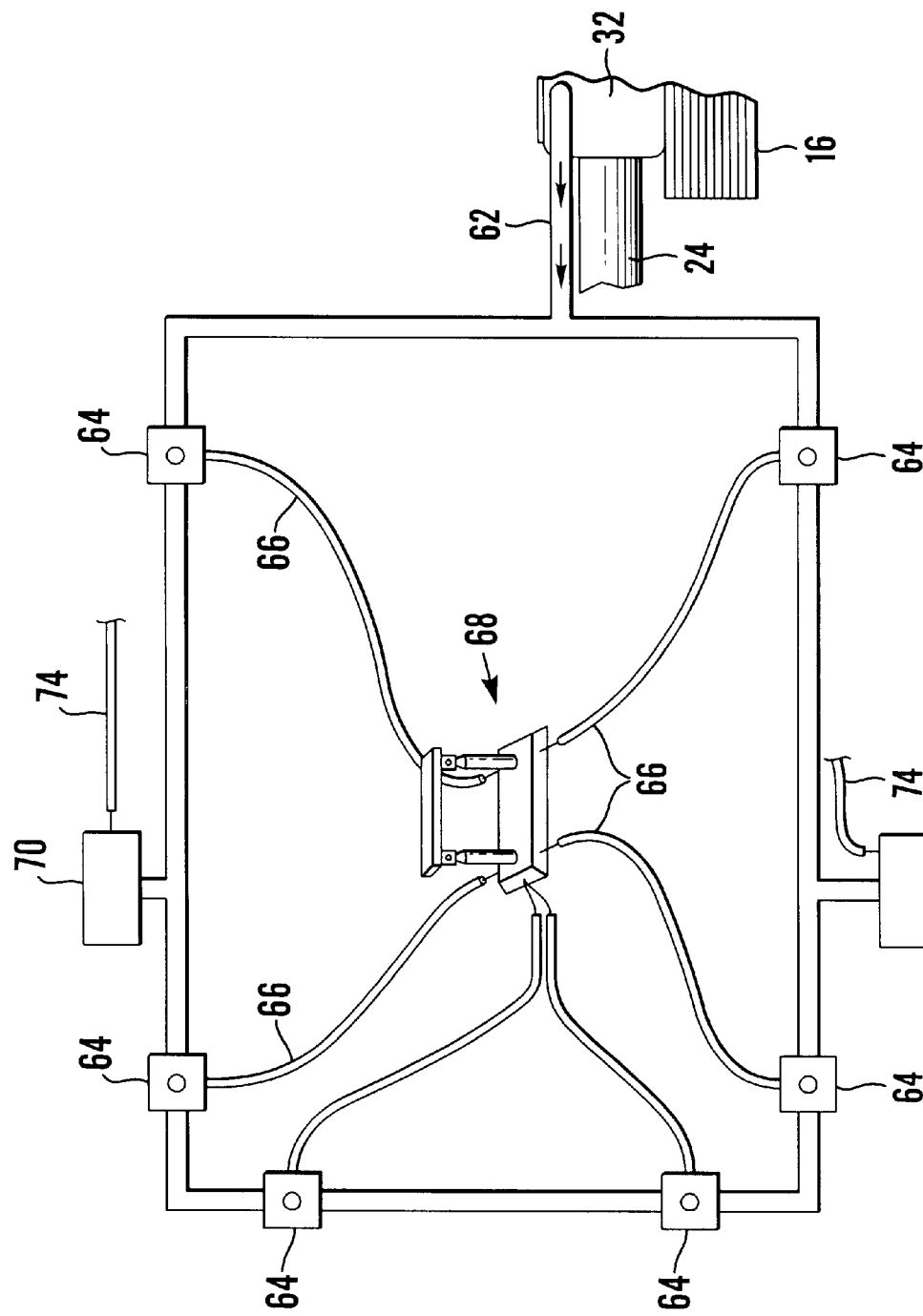
FIG. 7 is a schematic view of a high pressure water system in the vehicle.

The second part 32 of the guide arrangement has a second outlet 60 coupled to high pressure lines 62 (FIG. 7) which are preferably built into the outer skin of the body 12 and lead to a number of manoeuvring jets 64 provided on the outer surface of the vehicle body 10.

The manoeuvring jets 64 are controllable by cables 66 from a central manoeuvring lever 68 adjacent the driver's seat position.

The pressure lines 62 also provide feed to water motors 70 which under the control of cables 74 are operable to drive the mudguards 28 between the positions shown in FIG. 6A and FIG. 6B.

Within the casing the second part 32 there is provided a shutter 76 moveable from a first position in which it closes the second outlet 60 and gives unrestricted access to water in the second part 32 to the outlet jet 46 and a second position in which it closes off the outlet 46 and gives unrestricted access to water in the second part 32 to the outlet 60. The position of the shutter 76 is controlled by the driver making use of a cable (not shown).

It is preferred that the mudguards/skis 26 for the front wheels 14 are linked to the wheels 14 and turn with them as the vehicle is steered.

Figure 9:
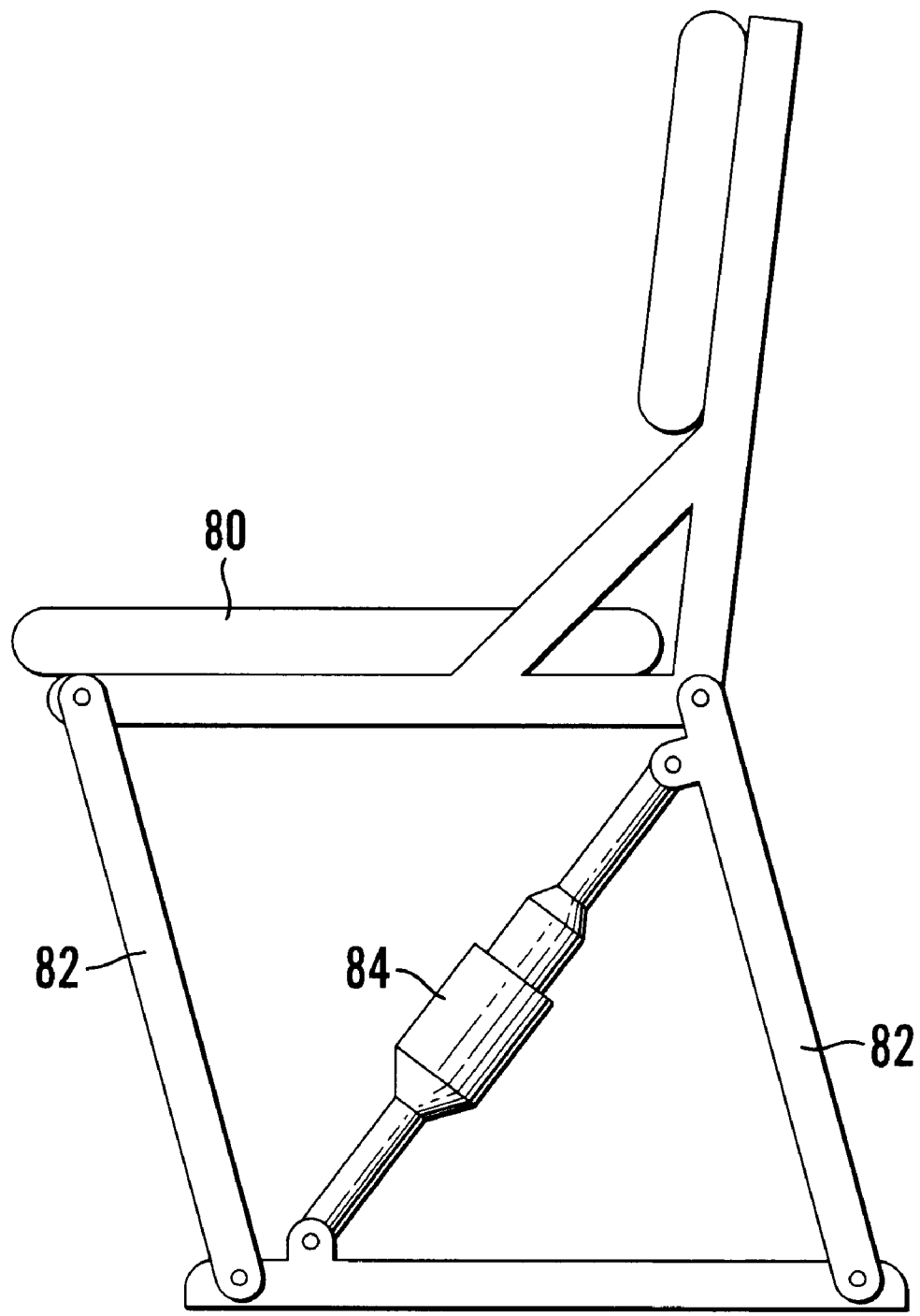
FIG. 9 illustrates a form of seat for use in the vehicle.

It is envisaged that the vehicle will travel across water at relatively high speeds and for the comfort of the occupants seats are provided as shown in FIG. 9. That is to say a seat having a sqaub 80 pivotally mounted on legs 82 which themselves are pivotally mounted on the deck or floor of the body. Shock absorbing members 84 are positioned as shown to allow movement of the seats to ease the strain on the occupants of the vehicle when travelling at high speed. The shock absorbers 84 are preferably in the form of gas filled springs and provide movement up and down of each seat squab 80 of approximately five inches.

It is envisaged that the inner skin of the vehicle is made in two parts—the first forming the main cockpit in which the driver and any passengers sit and the second forming an engine bay.

It will be appreciated that the slow speed manoeuvrability of the vehicle when on water is excellent. The outlet 46 from the guide means 30 can be closed by the driver with the shutter 76 leaving all the pressurised water available from the turbine formed by the wheel 16 in the guide arrangement to be passed to the manoeuvring jets 64 mounted on the sides of the vehicle body 12.

These are opened and closed by the simple operation of the single lever 68 from within the cockpit.

It will be appreciated that variations may be made to the described arrangements without departing from the scope of the invention. For example the described way of holding the two parts of the guide means in position against the rim of wheel 16 may be varied. The guide part 32 may be for example supported on the drive shaft 24 and the guide part 30 be held in contact with the rim of wheel 16 by two or more braces passing from one to the other side of the wheel and interconnecting the two guide parts 30 and 32.

INDUSTRIAL APPLICABILITY

It is envisaged that the amphibious vehicle here described may be used in many roles.

It may simply by used for example as a recreational vehicle and any luggage which may be taken with the occupants of the vehicle and carried in water tight panniers mountable on the side rear panels of the vehicle body 12 in the manner of the motorbike.

Alternatively the vehicle may be used as a rescue vehicle for river and inshore waters in which case it may carry, instead of the panniers, inflatable bodies. These bodies may be inflated once the vehicle has arrived at the scene of the incident increasing the stability of the vehicle in rough waters.

The vehicle may be provided with a front mounted water cannon operable by a driver when at the scene of an incident if there is need for fire to be put out.

Whilst the vehicle has been described as a tricycle it will be appreciated that the drive system may be applied to vehicles having four or more wheels and in such circumstances two or more driven wheels may be provided with enclosures as described to allow the vehicle to be driven on water.

It will further be seen that if an amphibious vehicle is provided with two or more driven wheels it is possible that each of the wheels be provided with guide means as disclosed.

It will be appreciated by the skilled reader that many variations may be made to the described arrangements without departing from the scope of the invention.

What is claimed is:

1. An amphibious vehicle having a drive system comprising a driven wheel of the vehicle with which is associated a guide arrangement, the guide arrangement having inlet and outlet means and the wheel being formed such that when the wheel is in water its rotation draws water into the guide arrangement via said inlet means, compresses that water and feeds it to the outlet means, and having a pair of wheels at the front of the vehicle and a single, driven wheel at the rear of the vehicle with which said guide arrangement is associated.

2. A vehicle as claimed in claim 1, wherein the driven wheel of the vehicle has the form of an impeller operable to draw water into the guide arrangement and feed it to the outlet means.

3. A vehicle as claimed in claim 1, wherein the guide arrangement is formed in two parts, a first part having one or more apertures opening forwardly of the direction of forward movement of the vehicle and forming said inlet means whilst the second part has an aperture opening rearwardly of the direction of forward movement of the vehicle and forming said outlet means.

4. A vehicle as claimed in claim 3, wherein the two parts are on opposed sides of the wheel.

5. A vehicle as claimed in claim 3, wherein said two parts of the guide arrangement are formed with means providing a seal between each part and the rim of the wheel with which the guide arrangement is associated.

6. A vehicle is claimed in claim 5, wherein said parts of the guide arrangement are fixed to the suspension supporting the associated wheel and are carried with that wheel.

7. A vehicle as claimed in claim 1, wherein said inlet means of the guide arrangement comprises a plurality of apertures each opening in the direction of forward movement of the vehicle.

8. A vehicle is claimed in claim 1, wherein said outlet means is in the form of a jet extending rearwardly of the vehicle.

9. A vehicle is claimed in claim 8, wherein said jet extends to direct water in an upward direction relative to the vehicle.

10. A vehicle as claimed in claim 1, wherein said outlet means has means for controlling the volume of water issuing therefrom.

11. A vehicle as claimed in claim 1, wherein the front wheels of the vehicle have mud guards associated therewith which when the vehicle is on land lie generally above the wheels and which when the vehicle is in water may be rotated to underlie the vehicle wheels and form skis to ease the forward movement of the vehicle through the water.

12. A vehicle as claimed in claim 11, wherein the vehicle is provided with running boards extending rearwardly of the mud guards associated with the front wheels of the vehicle.

13. An amphibious vehicle having a drive system comprising a driven wheel of the vehicle with which is associated a guide arrangement, the guide arrangement having inlet and outlet means and the wheel being formed such that when the wheel is in water its rotation draws water into the guide arrangement via said inlet means, compresses that water and feeds it to the outlet means, wherein said outlet means has means for controlling the volume of water issuing therefrom.

14. An amphibious vehicle having a drive system comprising a driven wheel of the vehicle with which is associated a guide arrangement, the guide arrangement having inlet and outlet means and the wheel being formed such that when the wheel is in water its rotation draws water into the guide arrangement via said inlet means, compresses that water and feeds it to the outlet means, wherein said guide arrangement has an outlet coupled to a number of steering jets mounted on the body of the vehicle.

15. A vehicle as claimed in claim 14, wherein there are six such steering jets on the body of the vehicle.

\* \* \* \* \*